(12) United States Patent
Kamiya et al.

(10) Patent No.: US 6,391,162 B1
(45) Date of Patent: *May 21, 2002

(54) DESALINATION APPARATUS AND METHOD OF OPERATING THE SAME

(75) Inventors: Ichiro Kamiya, Tokyo; Yuzo Narasaki, Kanagawa-ken; Hidemitsu Otsuka, Tokyo; Manabu Morishita; Haruki Sato, both of Kanagawa-ken, all of (JP)

(73) Assignees: Ebara Corporation, Tokyo; Haruki Sato, Kanagawa, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/214,010
(22) PCT Filed: Jun. 19, 1997
(86) PCT No.: PCT/JP97/02098
  § 371 Date: Dec. 17, 1998
  § 102(e) Date: Dec. 17, 1998
(87) PCT Pub. No.: WO97/48646
  PCT Pub. Date: Dec. 24, 1997

(30) Foreign Application Priority Data

Jun. 19, 1996 (JP) .............................. 8-179901
Jun. 19, 1996 (JP) .............................. 8-179902

(51) Int. Cl.$^7$ ................ B01D 3/10; C02F 1/14
(52) U.S. Cl. ............... 203/11; 159/161.1; 159/901; 159/903; 159/47.1; 159/DIG. 16; 202/173; 202/186; 202/205; 202/234; 203/49; 203/73; 203/87; 203/DIG. 1; 203/100; 126/569
(58) Field of Search .............. 203/22, 24, 25–27, 203/49, 91, 71, 73, 100, 10, DIG. 1, DIG. 8, DIG. 9, DIG. 14, DIG. 17, 87, 11; 159/903–904, 901, 16.1, DIG. 16, DIG. 8, DIG. 33, 47.1; 202/234, 205, 186, 173

(56) References Cited

U.S. PATENT DOCUMENTS

| | | | | |
|---|---|---|---|---|
| 3,394,054 A | * | 7/1968 | Hoham | 202/177 |
| 4,229,941 A | * | 10/1980 | Hope | 60/641 |
| 4,318,781 A | * | 3/1982 | Iida | 202/234 |
| 4,373,996 A | * | 2/1983 | Maruko | 202/173 |
| 4,427,875 A | * | 1/1984 | Fleming | 219/341 |
| 4,525,242 A | * | 6/1985 | Iida | 202/173 |
| 4,686,961 A | * | 8/1987 | Garrison | 126/433 |
| 5,672,250 A | * | 9/1997 | Ambadar et al. | 203/DIG. 1 |

FOREIGN PATENT DOCUMENTS

| | | |
|---|---|---|
| DE | 2707715 A | 8/1978 |
| JP | 54029879 A | 3/1979 |
| JP | 54110975 A | 8/1979 |
| JP | 62-129192 | 6/1987 |
| JP | 63-82489 | 5/1988 |
| JP | 3003844 | 8/1994 |

OTHER PUBLICATIONS

JP–A–2–102777 (Japanese Patent Public Disclosure) published Apr. 16, 1990.

JP–A–52–52867 (Japanese Patent Public Disclosure) published Apr. 28, 1997.

* cited by examiner

Primary Examiner—Virginia Manoharan
(74) Attorney, Agent, or Firm—Armstrong, Westerman & Hattori, LLP

(57) ABSTRACT

A desalination apparatus and method utilizing solar energy provided with a solar heat collector for heating a heating medium with solar energy, a heat exchanger cooperating with an evaporation can so as to subject the heating medium and raw water in the evaporation can to heat exchange and generate water vapor therein, a condenser cooperating with a raw water tank so as to receive the vapor from the evaporation can, cool the vapor by subjecting the vapor and raw water in the raw water tank to heat exchange and obtain distilled water.

19 Claims, 11 Drawing Sheets

DESALINATION APPARATUS AND METHOD OF OPERATING THE SAME

TECHNICAL FIELD TO WHICH THE INVENTION BELONGS

The present invention relates to a desalination apparatus that obtains fresh water from raw water, e.g. sea water, ground water (brine) containing salt, or industrial waste water, by a distillation method utilizing solar energy, and also relates to a method of operating the desalination apparatus.

CONVENTIONAL TECHNIQUE

Recently, great interest has been focused on the technique of desalinating sea water by utilizing solar energy. FIG. 17 is a schematic sectional view of a conventional desalination apparatus utilizing solar energy, which is known as "basin type solar heat distiller". The desalination apparatus in FIG. 17 has a basin 102 for holding raw water 101, e.g. sea water, and an air shield 103 that covers the basin 102 and is permeable to solar energy 104. The outer surface of the air shield 103 is used as a radiating part 106. In the desalination apparatus in FIG. 17, the raw water 101 in the basin 102 is heated with solar energy 104 to generate water vapor 105. The water vapor 105 is cooled and condensed on the inner surface of the air shield 103, and thus distilled water 107 is obtained.

Solar energy (sunlight) is a massive energy source in terms of quantity. However, the energy density of sunlight is extremely low, i.e. 1 kw/m$^2$ at most, and it varies considerably according to hours and seasons. For these reasons, solar energy cannot be applied to industrial techniques that require stable high-density energy. Desalination apparatuses utilizing solar energy, which have been proposed or developed so far, including the above-described basin type solar heat distiller, suffer low efficiency and are inferior in durability. Therefore, the conventional desalination apparatuses are not suitable for practical application.

PROBLEMS THAT THE INVENTION IS TO SOLVE

The present invention was made in view of the above-described problems, and it is an object of the present invention to provide a desalination apparatus utilizing solar energy that is capable of obtaining fresh water from raw water by satisfactorily grasping the characteristics of solar energy and effectively utilizing it, and also provide a method of operating the desalination apparatus. A particular object of the present invention is to provide a desalination apparatus capable of obtaining a large amount of distilled water at low temperature by utilizing a depressurized condition. Another object of the present invention is to increase the useful life of a solar heat collector by using a circulating heating medium. A further object of the present invention is to provide a multiple-effect desalination apparatus having a combination of evaporation cans and condensers, which can utilize with high efficiency thermal energy obtained in a solar heat collector. A still further object of the present invention is to provide a desalination apparatus that consumes very little power so that it can be driven by electric power from a solar battery. A still further object of the present invention is to make the structure of a multiple-effect desalination apparatus compact in size and simplified. In addition, an object of the present invention is to provide a simplified method of operating a multiple-effect desalination apparatus with high efficiency. Other objects and advantages of the present invention will be made apparent from the following description of embodiments, taken in connection with the drawings, and in the appended claims.

MEANS FOR SOLVING THE PROBLEMS

A desalination apparatus according to the present invention has a solar heat collector for heating a heating medium with solar energy, a heat exchanger cooperating with an evaporation can so as to subject the heating medium and raw water in the evaporation can to heat exchange and generate water vapor in the evaporation can, a condenser cooperating with a raw water tank so as to receive the water vapor from the evaporation can, cool the water vapor by subjecting the water vapor and raw water in the raw water tank to heat exchange and obtain distilled water, a distilled water tank for storing distilled water, vacuum means for evacuating the evaporation can and depressurizing the inside of the evaporation can so as to promote generation of water vapor in the evaporation can, and raw water supply means for supplying raw water to the evaporation can. The vacuum means depressurizes the inside of the evaporation can, a condensation space communicated with the inside of the evaporation can, a distilled water storing space, etc.

The desalination apparatus according to the present invention preferably has a plurality of evaporation cans arranged in series, i.e. in a multiple-effect relation to each other, and a condenser cooperating with the evaporation cans. In this case, the heat exchanger is arranged to cooperate with a first evaporation can so as to generate water vapor in the first evaporation can, and the condenser cooperating with the raw water tank is arranged to receive water vapor from a final evaporation can. The condenser cooperating with the evaporation cans receives water vapor from the upstream-side evaporation can, cool the water vapor with raw water in the downstream-side evaporation can and thereby produce distilled water, and also heat the raw water in the downstream-side evaporation can and generate water vapor.

More specifically, in a case where two evaporation cans arranged in series are used, the heat exchanger cooperates with the upstream-side evaporation can to generate water vapor in the upstream-side evaporation can. The condenser cooperating with the raw water tank is arranged to receive water vapor from the downstream-side evaporation can, cool the water vapor with raw water in the raw water tank and thereby produce distilled water. The condenser cooperating with the evaporation cans is disposed so as to receive water vapor from the upstream-side evaporation can, cool the water vapor with raw water in the downstream-side evaporation can and thereby produce distilled water, and also heat the raw water in the downstream-side evaporation can and generate water vapor.

In a case where three evaporation cans, i.e. a first, second and third evaporation cans, are used in series, two pairs of upstream- and downstream-side evaporation cans are formed, and two condensers cooperating with the evaporation cans are used. More specifically, the heat exchanger cooperates with the first evaporation can, and the condenser cooperating with the raw water tank is arranged to receive water vapor from the third evaporation can, cool the water vapor with raw water in the raw water tank and thereby produce distilled water. One of the condensers cooperating with the evaporation cans is disposed so as to receive water vapor from the first evaporation can, cool the water vapor with raw water in the second evaporation can and thereby produce distilled water, and also heat the raw water in the second evaporation can and generate water vapor. The other of the condensers cooperating with the evaporation cans is disposed so as to receive water vapor from the second evaporation can, cool the water vapor with raw water in the third evaporation can and thereby produce distilled water, and also heat the raw water in the third evaporation can and generate water vapor. In a case where N evaporation cans (N is an integer of 4 or higher) are used in series, N−1 pairs of upstream- and downstream-side evaporation cans are formed, and N−1 condensers are used to cooperate with the evaporation cans.

The desalination apparatus according to the present invention preferably has the following arrangements. (a) The heating medium is circulated by the action of thermosiphon in which the heating medium is heated in the solar heat collector to form vapor, which is then cooled to become liquid in the first evaporation can. (b) The heating medium is water. (c) The desalination apparatus has an air shield that covers the raw water tank, the air shield having a structure in which the inner surface of the air shield cools water vapor to form distilled water and collects it, the outer surface of the air shield being adapted to be a radiating part. (d) The energy collecting part of the solar heat collector is placed in a part of the upper outer surface of the air shield on which sunlight impinges. (e) At least a heating part of the evaporation can, which is constructed by disposing the heat exchanger or the heat transfer tube of the condenser, is placed in the air shield. (f) The solar heat collector is placed to cover the upper part of the whole desalination apparatus so as to intercept sunlight directed toward the other part of the desalination apparatus. (g) The heat exchanger has a heat transfer tube extending approximately horizontally in the evaporation can, the heating medium being passed through the heat transfer tube, and a heating part and evaporation part for the raw water are formed between the inner surface of the evaporation can and the outer surface of the heat transfer tube. Similarly, the condenser in the evaporation can has a heat transfer tube extending approximately horizontally in the evaporation cans, the water vapor being passed through the heat transfer tube, and a heating part and evaporation part for the raw water are formed between the inner surface of the evaporation can and the outer surface of the heat transfer tube. (h) The heat transfer tube is tilted slightly with respect to the horizontal direction so that the heating medium or vapor inlet side is above the heating medium or vapor outlet side. (i) The condenser cooperating with the raw water tank has a heat transfer tube extending approximately parallel and adjacent to the bottom surface of a the raw water tank. (j) The raw water tank is capable of containing raw water to a depth at which a thermal stratification is formed. (k) The raw water tank has an air diffuser tube that supplies air bubbles into the raw water. Preferably, the air diffuser tube is placed so as to supply air bubbles into the raw water near the surface of the raw water. (1) The desalination apparatus has solarlight power generation equipment, so that the desalination apparatus is driven by electric power supplied from the solarlight power generation equipment.

The desalination apparatus according to the present invention can selectively have the following arrangements. (m) A gap is provided between the energy collecting part of the solar heat collector, which is disposed along the upper outer surface of the air shield, and the upper outer surface of the air shield, and draft is induced in the gap by the stack effect. (n) The heat transfer tube is disposed to extend approximately parallel to the bottom surface of each evaporation can at a position not higher than ½ of the height of the evaporation can. (o) The amount of water held in the raw water tank is set so that the rise in temperature caused by cooling water vapor is not more than 10°C. per day.

In a desalination apparatus operating method according to the present invention, the desalination apparatus has a solar heat collector for heating a heating medium with solar energy, a plurality of evaporation cans, a raw water tank, a distilled water tank, a condenser disposed in the raw water tank, vacuum means for evacuating the evaporation cans and depressurizing the insides of the evaporation cans, and raw water supply means for supplying raw water to the evaporation cans.

The desalination apparatus operating method according to the present invention has the step of supplying a predetermined amount of raw water into the evaporation cans by operating the raw water supply means, the step of evacuating the evaporation cans to produce a predetermined degree of vacuum in the evaporation cans by operating the vacuum means, the step of conveying solar energy to the raw water in a first evaporation can from the solar heat collector through the heating medium to evaporate the raw water in the first evaporation can, the step of successively cooling water vapor generated in an upstream-side evaporation can with raw water in a downstream-side evaporation can to condense the water vapor to distilled water and collecting the distilled water in the distilled water tank and further generating water vapor in the downstream-side evaporation can, the step of cooling water vapor generated in a final evaporation can with raw water in the raw water tank to condense the water vapor to distilled water and collecting the distilled water in the distilled water tank, the step of taking out the distilled water collected in the distilled water tank, and the step of discharging concentrated raw water from the evaporation cans.

The operating method according to the present invention preferably has the following arrangements. (p) The step of supplying a predetermined amount of raw water into the evaporation cans and the step of evacuating the evaporation cans to produce a predetermined degree of vacuum in the evaporation cans by operating the vacuum means are started simultaneously. By doing so, the power consumed by the vacuum means can be reduced. (q) The step of taking out the distilled water collected in the distilled water tank, the step of discharging concentrated raw water from the evaporation cans, the step of supplying a predetermined amount of raw water into the evaporation cans by operating the raw water supply means, and the step of evacuating the evaporation cans to produce a predetermined degree of vacuum in the evaporation cans by operating the vacuum means are carried out and completed in a period of time before sunrise. These are preparatory operations for starting a distilled water producing operation, and it is desirable that these operations be carried out together before sunrise from the viewpoint of efficiency. However, the preparatory operations may be carried out periodically at a fixed time every day or every predetermined number of days according to the circumstances. It is also possible to perform a timer-controlled operation for the purpose of eliminating the need for labor before sunrise.

The operating method according to the present it invention can selectively have the following arrangement. (r) When the amount of distilled water collected in the distilled water tank exceeds a predetermined quantity or it becomes necessary to take out the distilled water during the operation of the desalination apparatus, the communication between the distilled water tank and the condenser is cut off. Then, the distilled water tank is opened to the atmospheric air, and the distilled water is taken out. The inside of the emptied distilled water tank is depressurized by the vacuum pump. Thereafter, the distilled water tank is communicated with the condenser.

OPERATION OF THE INVENTION

According to the present invention, a preparatory process described below is carried out before a distilled water producing operation of the desalination apparatus is started. First, the atmospheric port is opened, and when the pressure in the internal space in the apparatus, which is formed as the inside of the evaporation can, the inside of the condenser and the inside of the distilled water tank are communicated with each other, reaches a level approximately equal to the atmospheric pressure, distilled water produced by the preceding operation in allowed to flow out of the distilled water tank, and raw water left in the evaporation can is discharged. Next, the atmospheric port, the outlet port of the distilled water tank and the raw water discharge port of the evaporation can are closed, and thus the internal space is closed. Then, the internal space is evacuated by operating the vacuum means to produce a predetermined reduced-pressure condition therein. At this time, a predetermined amount of raw water in the raw water tank is supplied into the evaporation can by operating the raw water supply means. By supplying the raw water into the evaporation can while evacuating it, the raw water is allowed to flow into the evaporation can, and the raw water in the evaporation can is degassed by the reduced-pressure condition in the evaporation can. When a predetermined amount of raw water has been supplied into the evaporation can, the raw water supply port is closed. The degree of depressurization of the internal space in the apparatus is determined by taking into consideration the power required for depressurization and the water vapor generation efficiency by the low-temperature heat source. After the pressure in the internal space has been reduced to a predetermined level, the communication between the internal space and the vacuum means is cut off, and the operation of the vacuum means is stopped.

After the completion of the above-described preparatory process, the following distilled water producing operation is carried out. The heating medium is heated with solar energy in the solar heat collector. Preferably, the heating medium is changed into heating medium vapor. The raw water in the evaporation can is heated by the heating medium through the heat exchanger to generate water vapor. In a case where there is only one evaporation can, water vapor in the evaporation can is cooled and condensed by the raw water in the raw water tank through the condenser cooperating with the raw water tank to produce distilled water, which is then collected in the distilled water tank. In a case where N evaporation cans are arranged in a multiple-effect structure, N−1 pairs of upstream- and downstream-side evaporation cans are formed. In each of the N−1 pairs, water vapor in the upstream-side evaporation can is cooled with raw water in the downstream-side evaporation can through the condenser cooperating with the evaporation cans, thereby producing distilled water. At the same time, the raw water in the downstream-side evaporation can is heated to generate water vapor. Water vapor in the final evaporation can is introduced into the condenser disposed in the raw water tank, in which it is cooled to become distilled water, which is then collected in the distilled water tank.

EMBODIMENTS OF THE INVENTION

Figure 1:
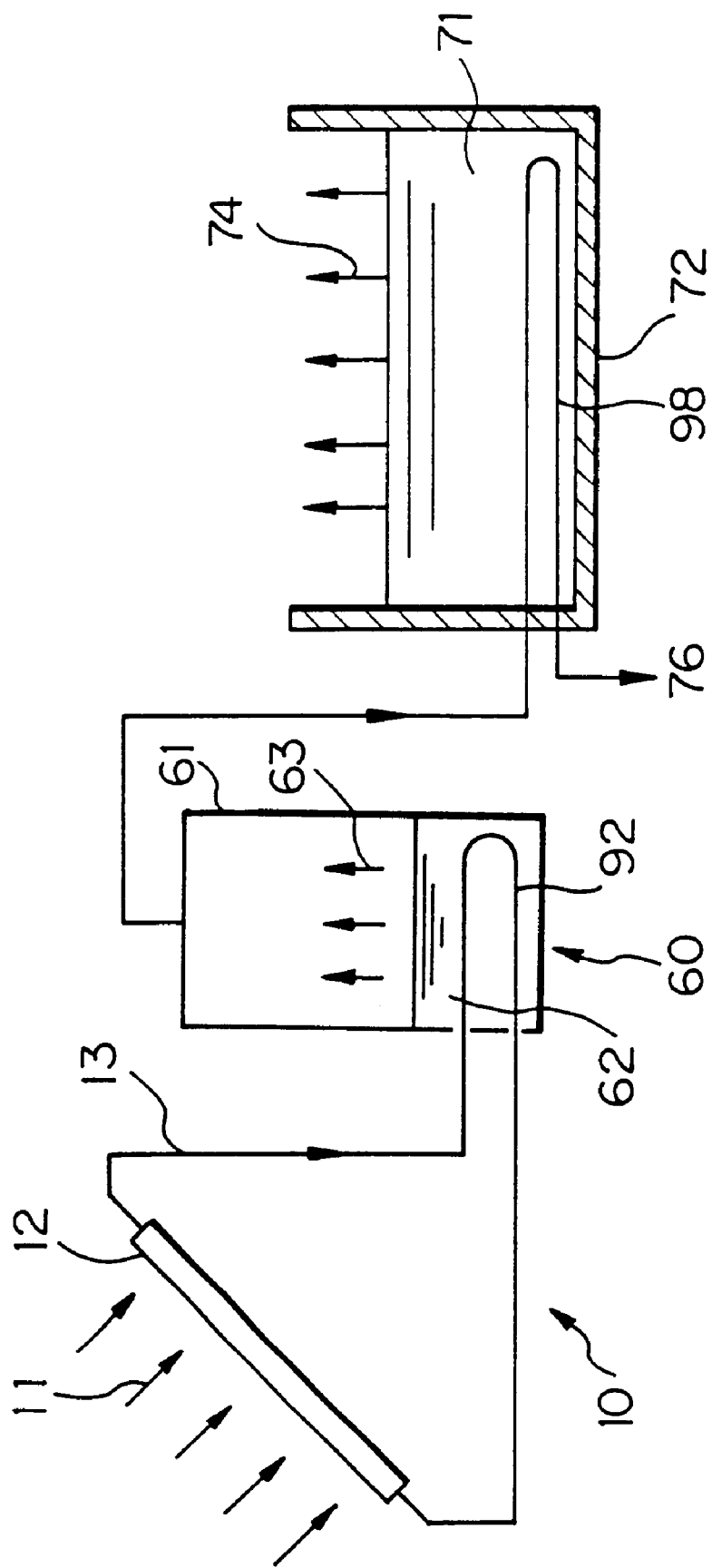
FIGS. 1 to 4 are diagrams respectively showing basic structural examples of a desalination apparatus utilizing solar energy according to the present invention.

Embodiments of the present invention will be described below with reference to the drawings. FIG. 1 is a diagram showing a first basic structural example of a desalination apparatus utilizing solar energy according to the present invention. The desalination apparatus in FIG. 1 has a solar heat collector 10, an evaporation can 60, and a raw water tank 72.

The solar heat collector 10 has an energy collecting part 12 for collecting solar energy 11 and converts solar energy 11 collected at the collecting part 12 into thermal energy to heat a heating medium 13. The energy collecting part 12 has a light-absorbing plate arranged to be capable of heat exchange with the heating medium. The energy collecting part 12 further has an outer shell that covers the light-absorbing plate to prevent dissipation of heat from the light-absorbing plate. The sunshine side of the outer shell is constructed of a transparent panel that is permeable to sunlight. The outer shell may be constructed of a vacuum glass tube, for example, which has a high degree of thermal insulation. The inside of a can body 61 is depressurized by a vacuum means (not shown), e.g. a vacuum pump. Raw water 62 in the evaporation can 60 is heated with the high-temperature heating medium 13 through a heat exchanger 92 to change into water vapor 63 under a reduced pressure.

Water vapor 63 in the can body 61 is introduced into a condenser 98 in which the water vapor 63 is subjected to heat exchange with raw water 71 in the raw water tank 72. The water vapor 63 is cooled and condensed with the raw water 71 to form distilled water 76. At the same time, the water vapor 63 heats the raw water 71.

Figure 2:
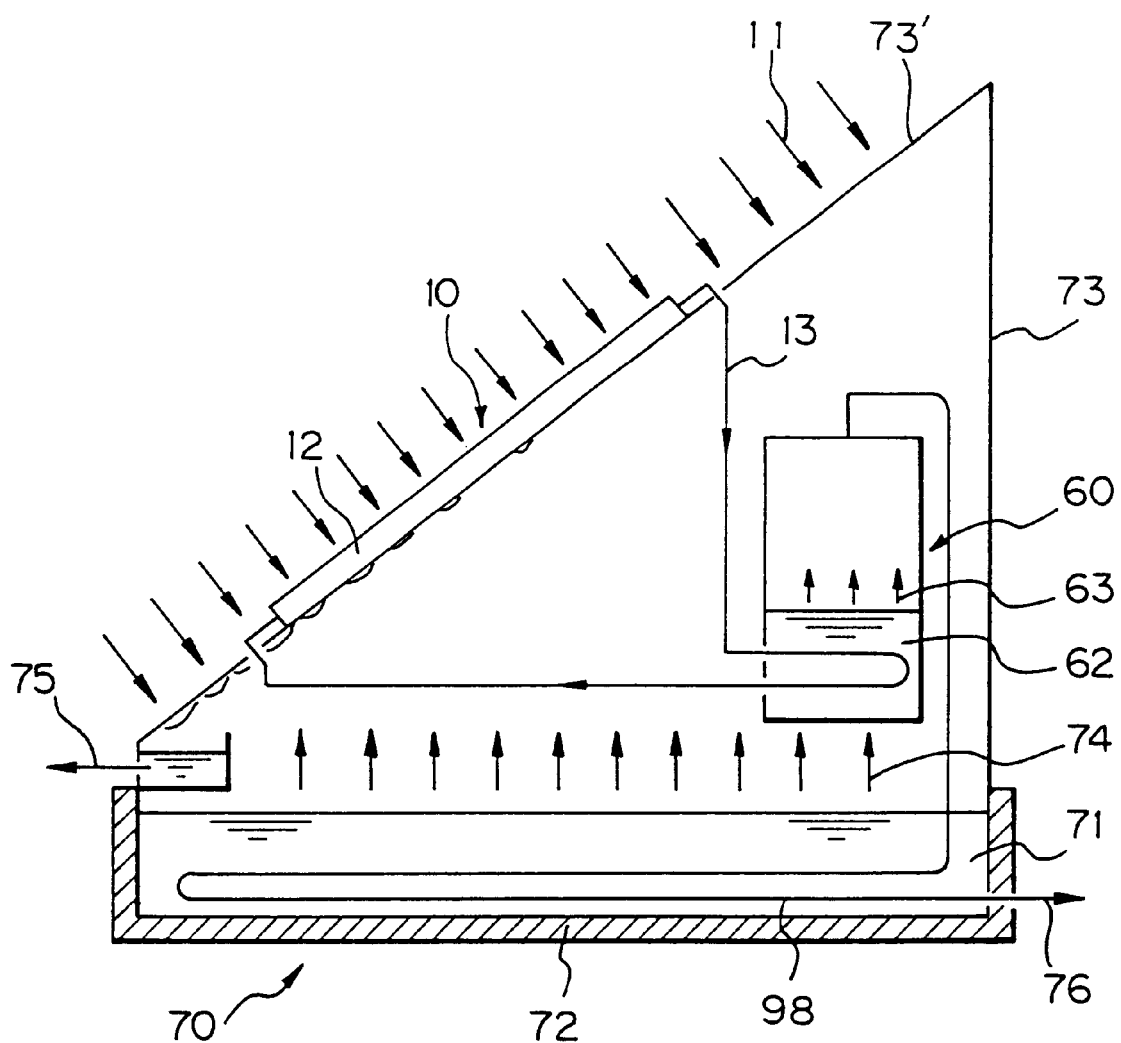

FIG. 2 is a diagram showing a second basic structural example of the desalination apparatus utilizing solar energy according to the present invention. In FIG. 20, a basin type solar heat distiller 70 has an arrangement in which a raw water tank 72 holding raw water 71 is covered with an air shield 73 that transmits most of solar energy 11. Thus, the raw water 71 is allowed to absorb solar energy 11 directly, and the raw water 71 is heated. Moreover, the outer surface of the air shield 73 is designed as a radiating part 73', and the inner surface of the air shield 73 is arranged to condense water vapor 74 evaporating from the raw water to obtain distilled water 75. Water vapor 63 in the can body 61 of the evaporation can 60 is introduced into the condenser 98 where it is cooled by the raw water 71 in the basin type solar heat distiller 70. The water vapor 63 is cooled and condensed with the raw water 71 to form distilled water 76. At the same time, the water vapor 63 heats the raw water 71. It is preferable from the viewpoint of preventing loss of heat through dissipation from the evaporation can 60 and from the space-saving point of view that the evaporation can 60 be incorporated in the air shield 73.

In the desalination apparatus in FIG. 2, the energy collecting part 12 of the solar heat collector 10 is installed so as to cover a part or the whole of the upper part of the outer surface of the air shield 73 on which sunlight impinges. The energy collecting part 12 may be integrated with the air shield 73. Alternatively, a part of the air shield 73 may also serve as the energy collecting part 12.

The evaporation can 60 is incorporated in the basin type solar heat distiller 70. Raw water 62 in the evaporation can 60 is heated with the heating medium 13 heated in the solar heat collector 10. Water vapor 63 generated in the evaporation can 60 serves as a heat source for the raw water 71 in the raw water tank 72 and condenses to distilled water 76. Water vapor 74 generated from the raw water 71 in the raw water tank 72 is condensed on the inner surface of the air shield 73, the outer surface of which serves as a radiating part 73', to form distilled water 75.

Figure 3:
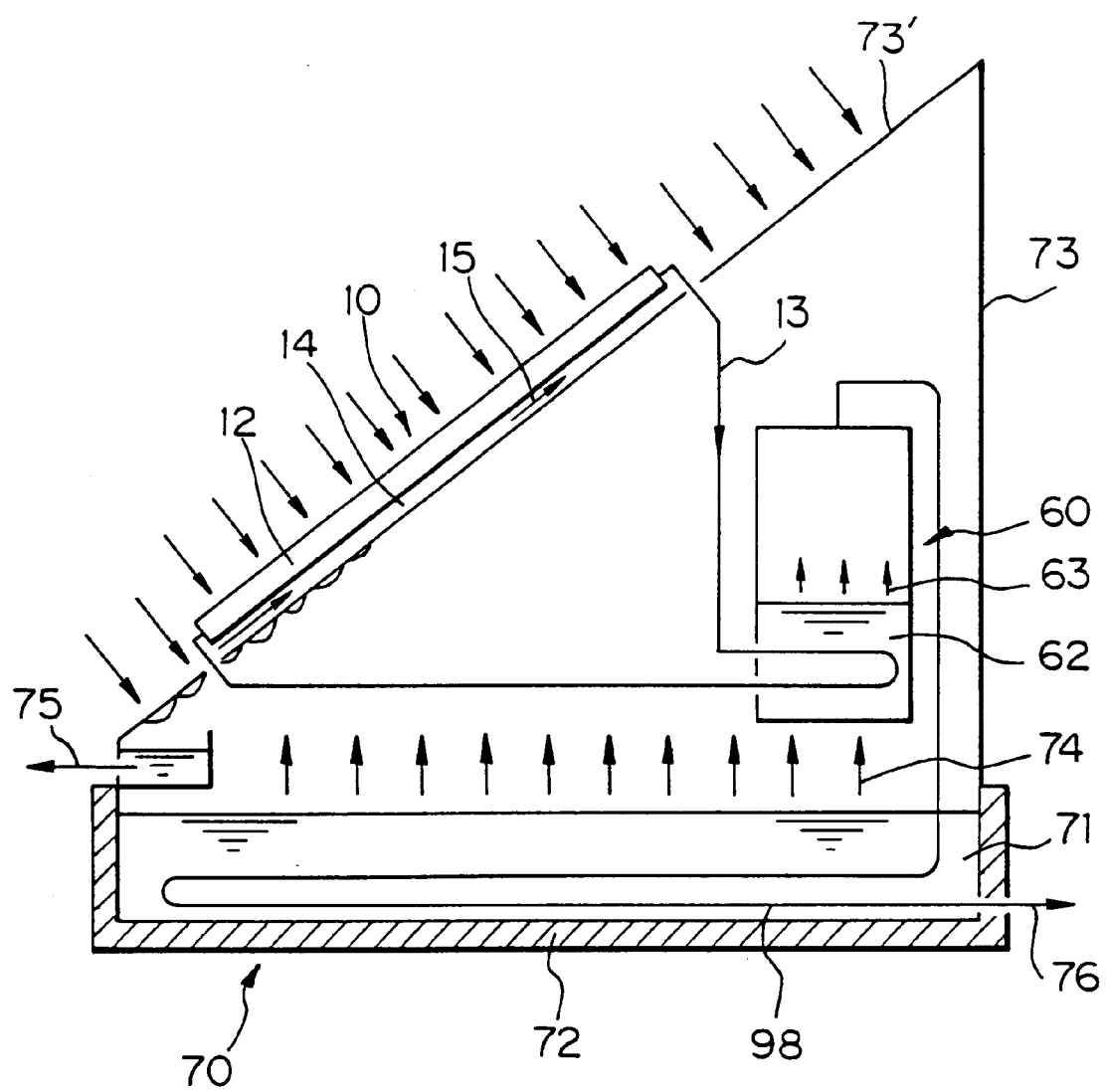

FIG. 3 is a diagram showing a third basic structural example of the desalination apparatus utilizing solar energy according to the present invention. In FIG. 3, constituent elements common to FIGS. 1 or 2 and 3 are denoted by common reference characters, and a description thereof is omitted. The desalination apparatus in FIG. 3 is similar to that in FIG. 2 except an arrangement in which a gap 14 is provided between the energy collecting part 12 and the radiating part 73' of the air shield 73, and outside air 15 passes through the gap 14 by the stack effect. Passage of the outside air 15 through the gap 14 promotes the radiation of heat from the radiating part 73'.

Figure 4:
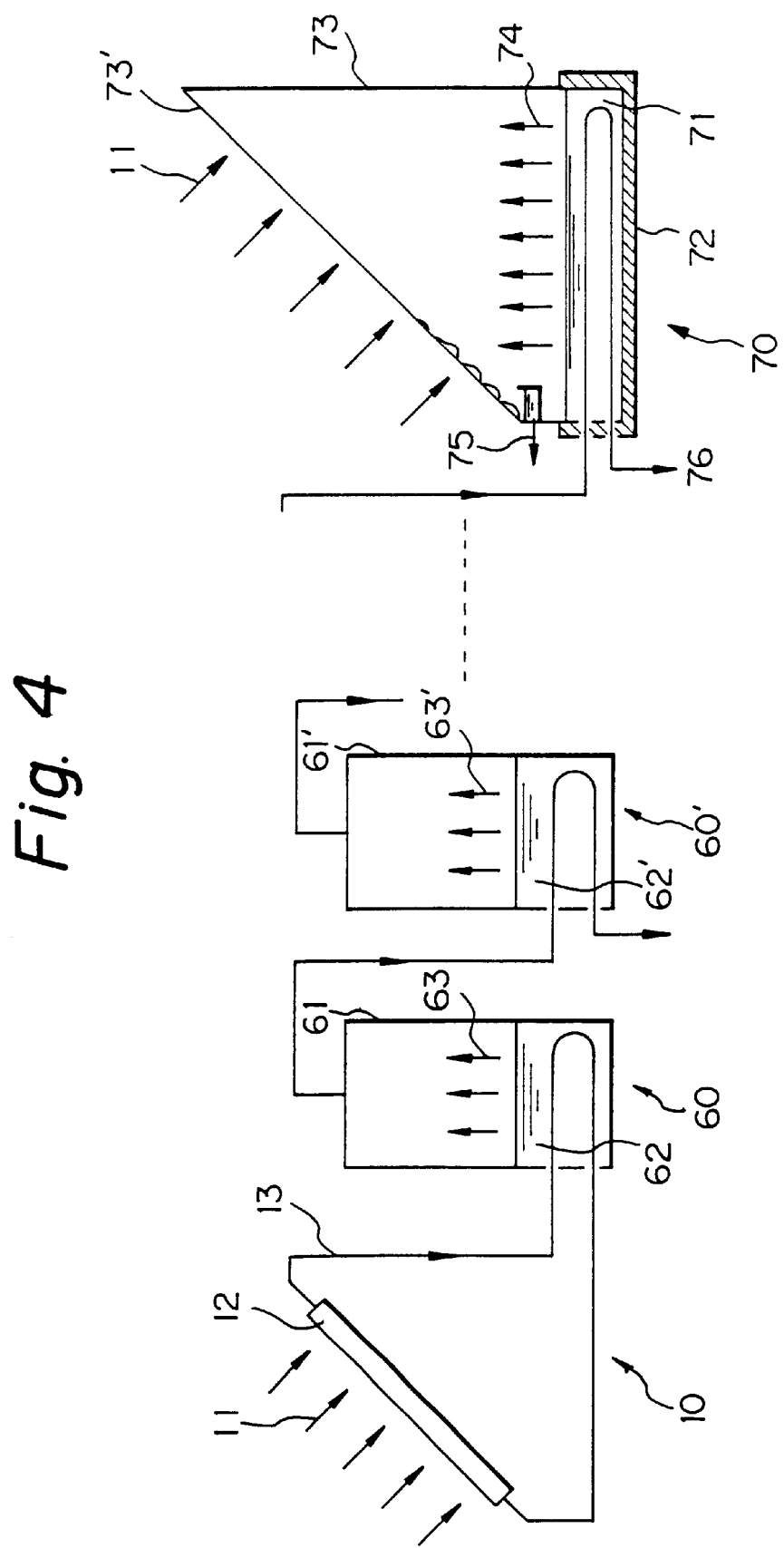

FIG. 4 is a diagram showing a fourth basic structural example of the desalination apparatus utilizing solar energy according to the present invention. In FIG. 4, constituent elements common to FIGS. 1 to 3 and 4 are denoted by common reference characters, and a description thereof is omitted. The decalination apparatus in FIG. 4 hag a plurality of evaporation cans 60, 60' . . . in respective stages. The evaporation cans 60, 60' . . . are arranged in a multiple-effect structure in which the evaporation can 60 in the first stage uses the heating medium 13 in the solar heat collector 10 as a heat source for raw water 62 in this stage; the evaporation can 60' in the second stage uses water vapor 63 generated in the evaporation can 60 as a heat source for raw water 62 in this stage; and the subsequent evaporation can 60'' uses water vapor 63' generated in the evaporation can 60' in the preceding stage as a heat source for raw water 62''. It is preferable that at least the heating and evaporation parts of these evaporation cans 60, 60' . . . be incorporated in the air shield 73, although this is different from the arrangement illustrated in the figure.

In the desalination apparatuses shown in FIGS. 2 to 4, the heating medium 13 in the solar heat collector 10 can be used as a heat source for the raw water 71 in the basin type solar heat distiller 70.

Figure 5:
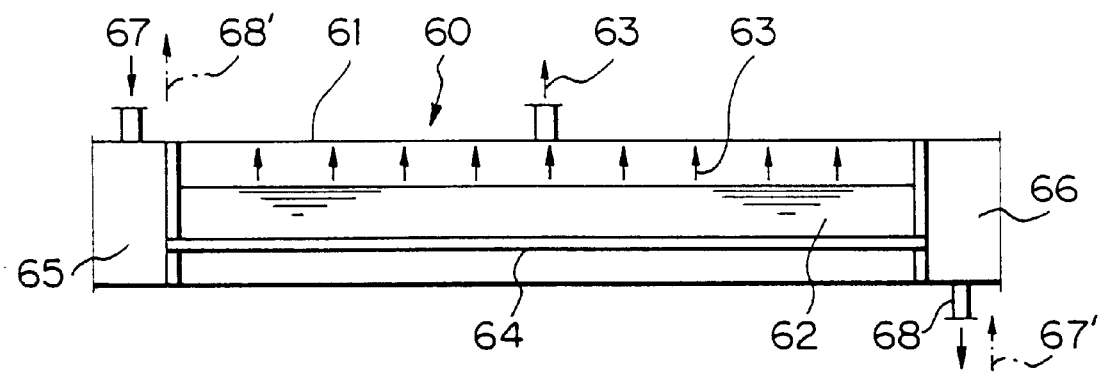
FIGS. 5 to 8 are diagrams respectively showing basic structural examples of an evaporation can used in the desalination apparatus according to the present invention.

FIG. 5 is a diagram showing a first basic structural example of the evaporation can. The evaporation can 60 has at least one heat transfer tube 64 extending approximately horizontally in a can body 61 installed horizontally. At both ends of the heat transfer tube 64, chambers 65 and 66 are provided for installing heat transfer tubes 64 collectively. One chamber 65 is provided with a heating medium vapor inlet or water vapor inlet 67, and the other chamber is provided with a condensed heating medium outlet or condensate outlet 68. The inside of the heat transfer tube 64 is used as a heat radiation part for the heating medium or a condensation part for water vapor, and the outside of the heat transfer tube 64 is used as a heating and evaporation part for raw water.

Thus, the evaporation can 60 has heating and evaporation parts integrated into one part and is arranged in the form of a horizontal type. Consequently, the structure of the evaporation can is simplified, and high performance can be obtained even if the temperature difference is small. In addition, it becomes easy to incorporate the evaporation can into a basin type solar heat distiller. The heat transfer tube 64 may be formed in another configuration that endures a vacuum and exhibits excellent heat transfer characteristics.

The evaporation can 60 arranged as shown in FIG. 5 may be placed at a tilt as a whole such that the outlet 68 for the heating medium or condensate is positioned below the inlet 67 for the heating medium or vapor so that condensate in the heat transfer tube 64 can be discharged easily, although this arrangement is not shown in the figure. By placing the whole evaporation can 60 at a tilt as stated above, condensate in the heat transfer tube 64 is discharged from the outlet 68 without detention. In a case where the heating medium is used in a liquid phase, the arrangement may be such that a high-temperature heating medium liquid inlet 67' is located at a lower position, and a low-temperature heating medium liquid outlet 68' in located at an upper position.

The high-temperature heating medium from the solar heat collector is introduced into the heat transfer tube 64 through the inlet 67 or the high-temperature heating medium liquid inlet 67'. The heating medium subjected to heat radiation is discharged from the outlet 68 or the low-temperature heating medium liquid outlet 68' and returned to the solar heat collector. In the case of multiple-effect evaporation cans 60, water vapor 63 generated in the evaporation can 60 in the preceding stage is introduced into the heat transfer tube 64 from the inlet 67, and distilled water is discharged from the outlet 68.

Figure 6:
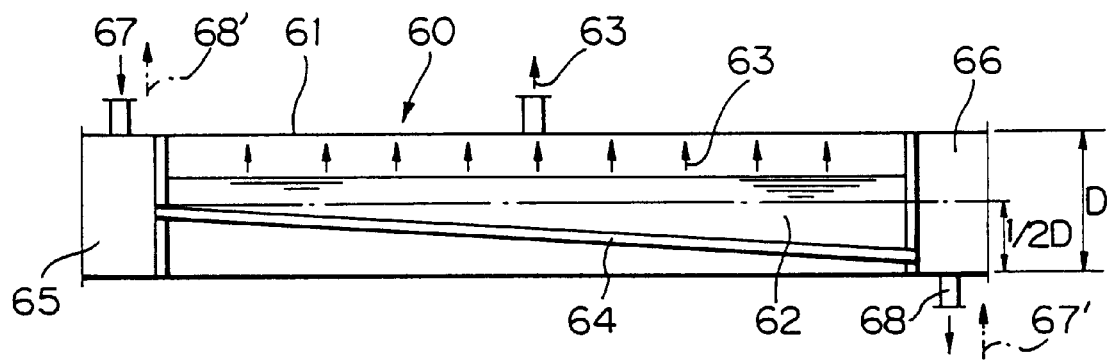

FIG. 6 is a diagram showing a second basic structural example of the evaporation can. Constituent elements common to FIGS. 5 and 6 are denoted by common reference characters. The heat transfer tube 64 in the can body 61 in FIG. 6 is placed in the horizontal direction or at a tilt to the bottom surface of the evaporation can. The outlet 68 is positioned below the inlet 67. In a case where the heating medium is used in a liquid phase, the evaporation can in FIG. 6 may also be arranged such that the heating medium liquid inlet 67' is located at a lower position, and the heating medium liquid outlet 68' is located at an upper position.

By placing the heat transfer tube 64 at a tilt as stated above, condensate in the heat transfer tube 64 is discharged through the outlet 68 without detention. If the heat transfer tube 64 is placed within a lower half of the diameter D of the can body 61 and the liquid level of the raw water 22 is set approximately at the center of the can body 61, the evaporation area can be maximized, and distilled water of good quality can be obtained without entrainment of mist.

Figure 7:
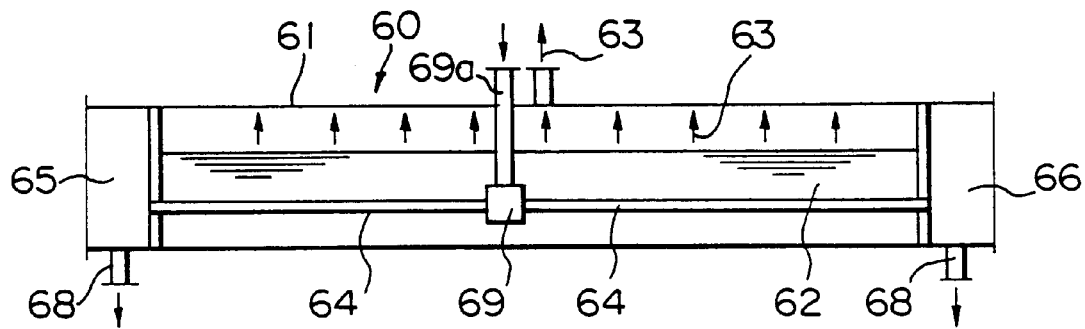

FIG. 7 is a diagram showing a third basic structural example of the evaporation can. Constituent elements common to FIGS. 5, 6 and 7 are denoted by common reference A characters. The evaporation can 60 has at least one set of heat transfer tubes 64 placed in a can body 61 installed horizontally. A chamber 69 is provided in the center of the can body 61 to install the heat transfer tubes 64 collectively, and at both sides in the evaporation can 21, chambers 65 and 66 are provided for installing the heat transfer tubes 64 collectively. The chamber 69 in the center is provided with an inlet 69a for the heating medium or water vapor. The chambers 65 and 66 at both sides are provided with respective outlets 28 for the heating medium or distilled water. According to the arrangement of the evaporation can 60 in FIG. 7, even in a case where the can body 61 of the evaporation can 60 is long and the heat transfer tubes 64 become long, the pressure loss on the condensation side will not be increased, and the heating medium or distilled water can be discharged easily.

Figure 8:
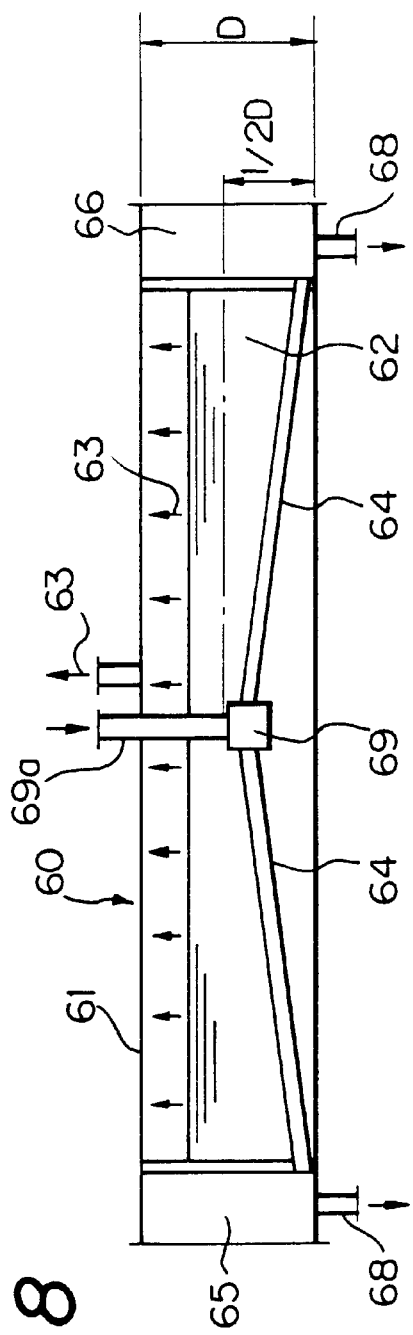

FIG. 8 is a diagram showing a fourth basic structural example of the evaporation can. Constituent elements common to FIGS. 5 to 7 and 8 are denoted by common reference characters. In the evaporation can 60 in FIG. 8, the heat transfer tubes 64 are placed at a tilt with respect to the horizontal direction. The outlets 68 are positioned below a chamber 69 communicated with a central inlet 69a. The heat transfer tubes 64 are disposed within a lower half of the diameter D of the can body 61. By virtue of the described arrangement, condensate in the heat transfer tubes 64 is discharged without detention. In addition, the liquid level of the raw water 62 can be set approximately at the center of the can body 61, and hence the evaporation area can be maximized. Therefore, distilled water of good quality can be obtained without entrainment of mist.

In the evaporation cans shown in FIGS. 5 to 8, the inside of the can body 61 and the inside of the heat transfer tube 64 are depressurized by a vacuum means having a vacuum pump or the like before a distilled water producing operation is started, and are maintained under the reduced pressure during the distilled water producing operation, thereby promoting generation of water vapor.

Figure 9:
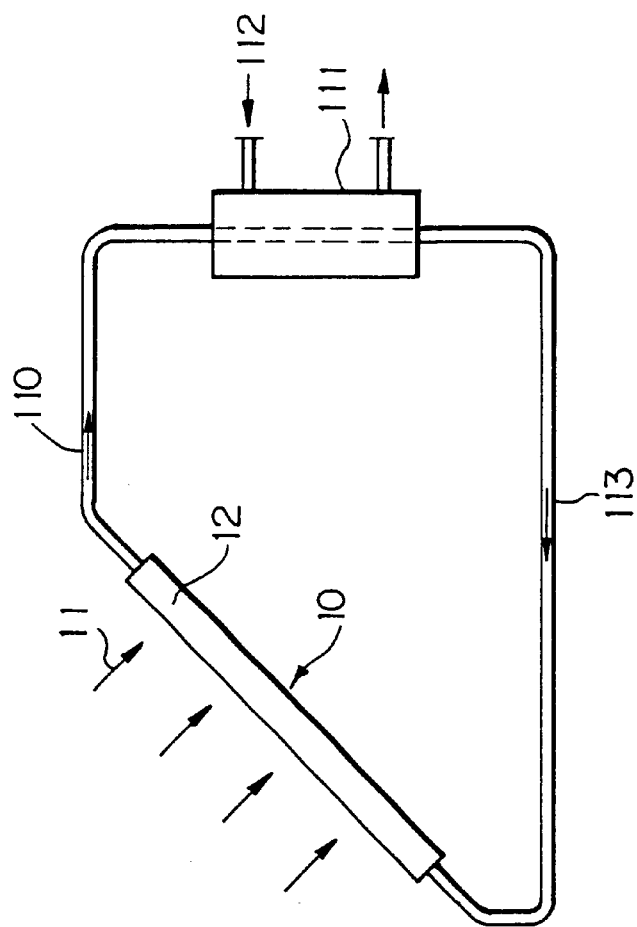
FIG. 9 is a diagram for describing the thermosiphon action.

FIG. 9 is a diagram for describing the principle on which the heating medium in the solar heat collector 10 circulates by the thermosiphon action. The heating medium that is heated by the solar energy 11 collected in the energy collecting part 12 of the solar heat collector 10 forms vapor 110, which is then sent to a condensation means 111. In the condensation means 111, the vapor 110 is cooled with a cooling medium 112, which comprises a cooling liquid, and thus condensed to form a condensate 113. The condensate 113 flows into the energy collecting part 12. The heating medium is evaporated and condensed to thereby produce heat circulation (thermosiphon effect) and thus circulated without using a special power. The thermosiphon exhibits excellent follow-up performance and is accompanied with a phase change in the heat transfer part. Therefore, the thermosiphon is excellent in heat transfer performance and can be operated with a small temperature difference.

It should be noted that the heating medium can be forcedly circulated by using a pump without causing a phase change. Alternatively, the heating medium may be allowed to perform natural circulation based on a temperature difference. In this case, however, the system has the disadvantages that the need of power for the pump results in a low-efficiency operation, and that there is a need for a means for preventing a heat loss due to the circulation of the heating medium when solar irradiation is not available. Regarding the heating medium, it is conceivable to use organic heating mediums, e.g. chlorofluorocarbons and alcohol, which are widely used in refrigerating cycles. However, water is the most suitable in view of the safety and the influence on environments when the heating medium leaks.

Figure 10:
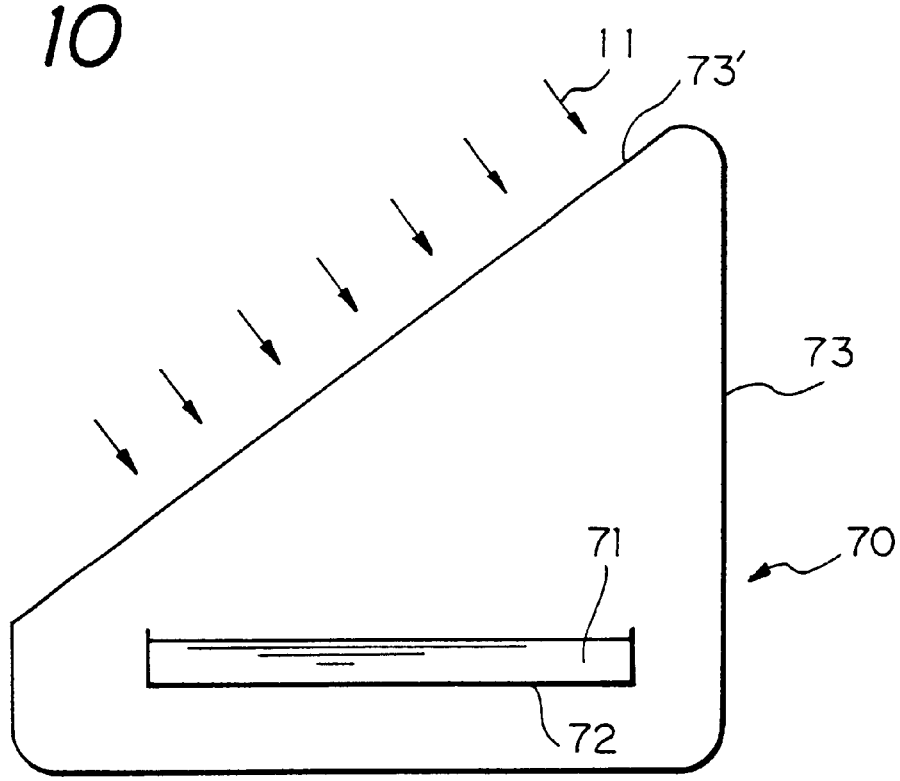
FIGS. 10 and 11 are diagrams respectively showing basic structural examples of a basin type solar heat distiller used in the desalination apparatus according to the present invention.

FIG. 10 is a diagram showing a first basic structural example of the basin type solar heat distiller. The basin type solar heat distiller 70 has an arrangement in which an independent raw water tank 72 is covered in its entirety with an air shield (e.g. a metal plate such as a thin aluminum plate or a thin stainless steel plate) 73 that has excellent thermal conductivity and cuts off light. This arrangement makes it possible to achieve an improvement in heat transfer characteristics at a radiating surface 73'. In addition, it is possible to markedly increase the radiation area not struck by the direct rays of the sun without impairing the heat insulation of the basin 72, and at the game time, shielding light makes it possible to suppress the increase in the number of living organisms (i.e. the appearance of algae and aquatic plankton) in the raw water in the raw water tank 72.

Figure 11:
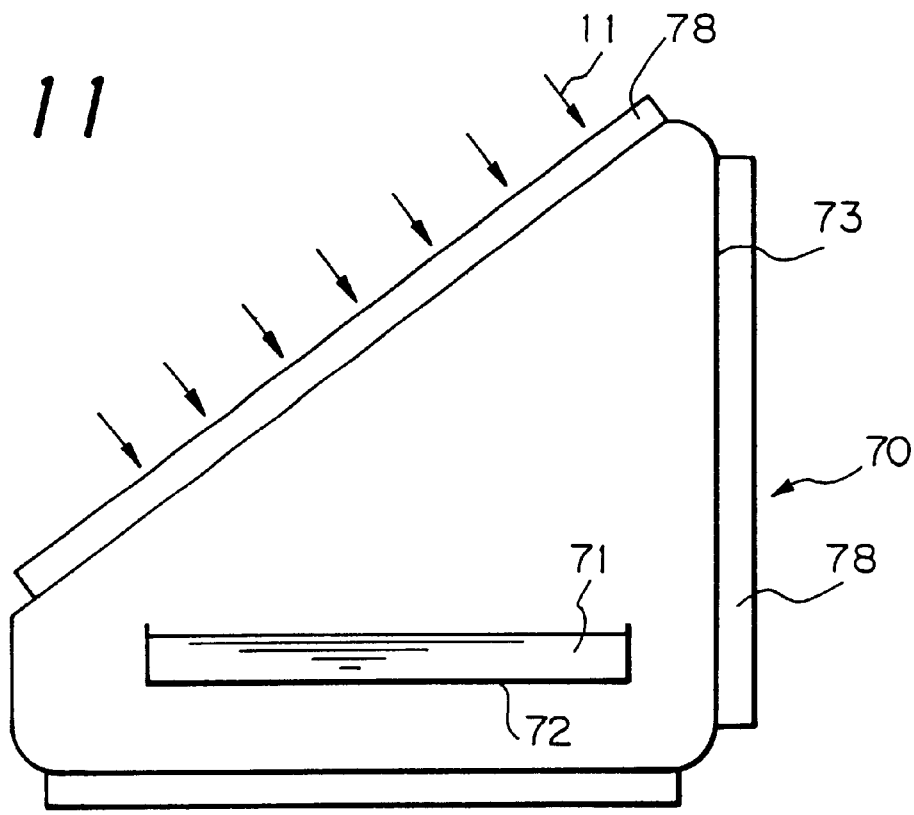

As shown in FIG. 11, the air shield 73 may be provided with fins 78. By doing so, the radiation area can be further increased. The fins 78 are preferably disposed so as to guide the air stream upwardly. The fins 38 may be provided on the inner surface of the air shield 73, although not shown in the figure. The air shield 33 can be constructed of a flat plate or a corrugated plate.

Figure 12:
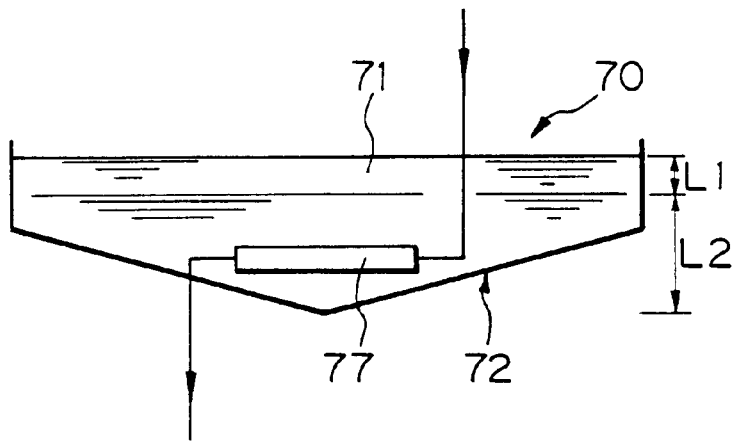
FIG. 12 is a diagram showing the condition of a basin in a basin type solar heat distiller.

As shown in FIG. 12, the depth of the raw water tank 72 is preferably greater than the depth where the thermal stratification of an evaporation layer L1 and a radiation layer L2 is formed in the raw water 71. That is, the depth of the raw water tank 72 should be greater than a depth that allows the separation of a radiation range (radiation layer L2), where a heat exchanger part 77 is placed in the lowermost part of the raw water tank 72 and the heating medium from the solar heat collector 10 or water vapor from the evaporation can 60 is sent to radiate heat, and a range (evaporation layer L1) where the raw water is heated to evaporate by absorption of solar energy 11. The depth at which the thermal stratification is formed is at least 100 mm, preferably 600 mm, although it is related to the size of the raw water tank 72.

The raw water 71 in the raw water tank 72 is a cooling source for an evaporation can. Regarding the size of the raw water tank 72, therefore, the amount of raw water held in the raw water tank 72 is set so that the temperature to which the raw water is heated by heat supplied from a raw water heating source is not higher than 10° C. However, the raw water 71 raised in temperature is cooled to return to a cooling source at the same time as condensate is recovered in the basin type solar heat distiller 70 by a heat radiating phenomenon at night. The raw water in the evaporation can is preferably the raw water 71 supplied from the raw water tank 72.

The system is arranged such that the concentrated raw water in the raw water tank 72 of the basin type solar heat distiller 70 is discharged from a lower part of the raw water tank 72 constantly or periodically by a predetermined amount, and at the same time, low-temperature raw water is externally supplied to the vicinity of the lowermost part of the raw water tank 72 so that the water surface of the raw water 71 is kept at a constant level. The basin type solar heat distiller 70 may be provided with a fan (not shown). By doing so, it is possible to promote the convection of the gas phase inside the basin type solar heat distiller 70, increase the convective heat transmission accompanied by evaporation of the raw water 71 in the basin type solar heat distiller 70, suppress the rise in temperature of the raw water 71 serving as a low heat source, and increase the amount of distilled water recovered in the basin type solar heat distiller 70.

Figure 13:
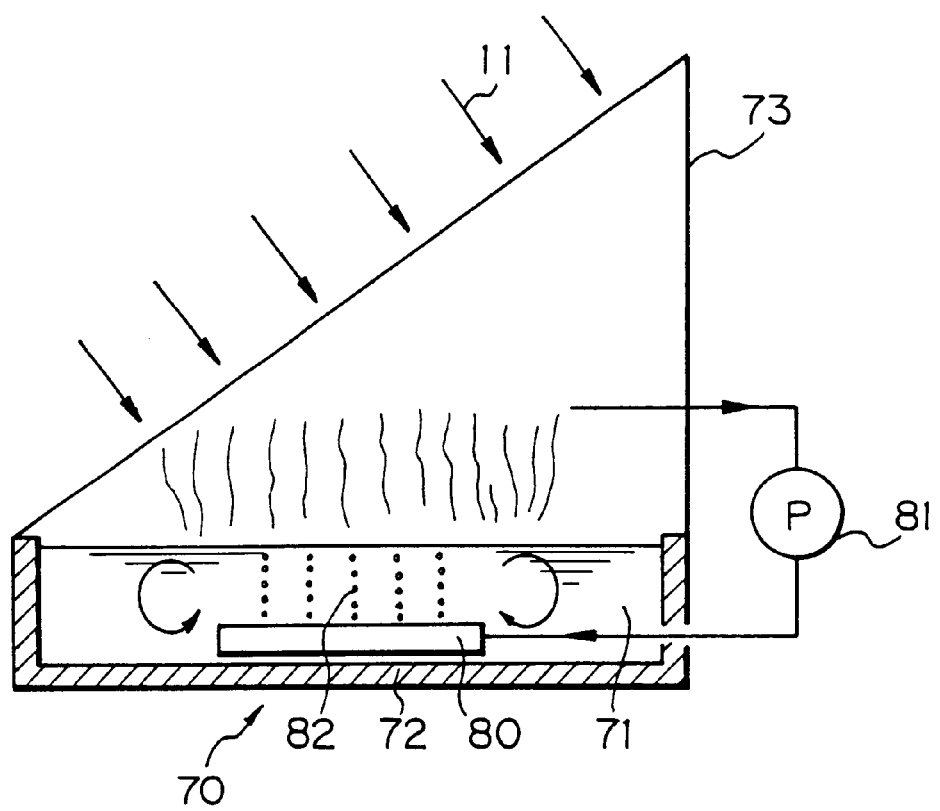
FIG. 13 is a diagram showing a basic structural example of a basin type solar heat distiller having an air pump.

FIG. 13 is a diagram showing a basic structural example of the basin type solar heat distiller. The basin type solar heat distiller 70 in FIG. 13 is arranged such that an air diffuser tube 80 is placed in the bottom of the raw water tank 72, and air in the upper part of the basin type solar heat distiller 70 is sent into the air diffuser tube 80 by an air pump 81 to diffuse air bubbles 42 into the raw water 71. By diffusing the air bubbles 82 into the raw water 71, the raw water 71 is stirred, and the convection is promoted. The convection of the gas phase is also promoted by air bubbles 82 released from the water surface, and thus evaporation of the raw water 71 is increased. Accordingly, it is possible to increase the amount of distilled water recovered. In addition, it is possible to suppress the rise in temperature of the raw water 71 serving as a low heat source. By diffusing air into the raw water in the vicinity of the surface thereof, the power required for the air diffusion is minimized, and the surface of the raw water is waved. Consequently, the surface area is increased, and thus the amount of water vapor generated can be increased.

By arranging the system such that the electric power required for operating the vacuum means, control valve, controller, etc. is supplied from solarlight power generation equipment, it becomes possible to install the desalination apparatus even in a remote area, e.g. a desert or a solitary island, where electric power cannot be supplied. In this case, it is desirable that electric equipment be driven by a direct-current power supply.

It is possible to facilitate achievement of a compact and efficient system by mounting a solar panel (solar battery) on the upper part of the outer surface on the sunshine side of the desalination apparatus to thereby unitize the solarlight power generation equipment and the desalination apparatus. If an arrangement is adopted in which a solarlight power generation cell is stuck directly to the heat collecting plate of the solar heat collector with an adhesive of good thermal conductivity, the installation of the power generation cell is easy, and it is possible to achieve a reduction in the weight of the system. In addition, because the solar heat can be absorbed with the heat collecting plate, the rise in temperature of the solarlight power generation cell is prevented, and it in possible to prevent lowering of the power generation efficiency. It is convenient to provide the desalination apparatus with rainwater recovering equipment.

Figure 14:
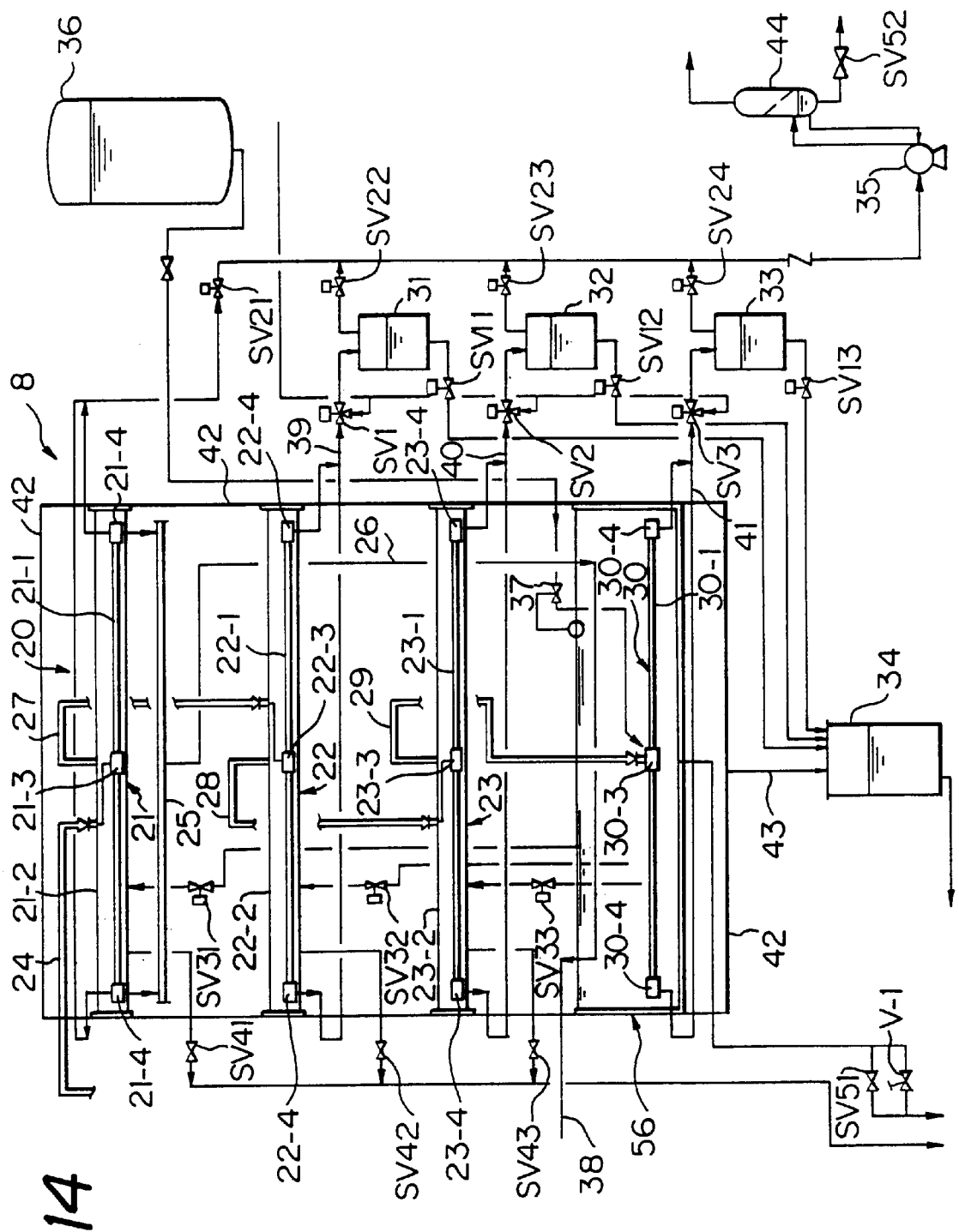
FIG. 14 is a diagram showing the layout of a multiple-effect desalination apparatus according to the present invention.
Figure 15:
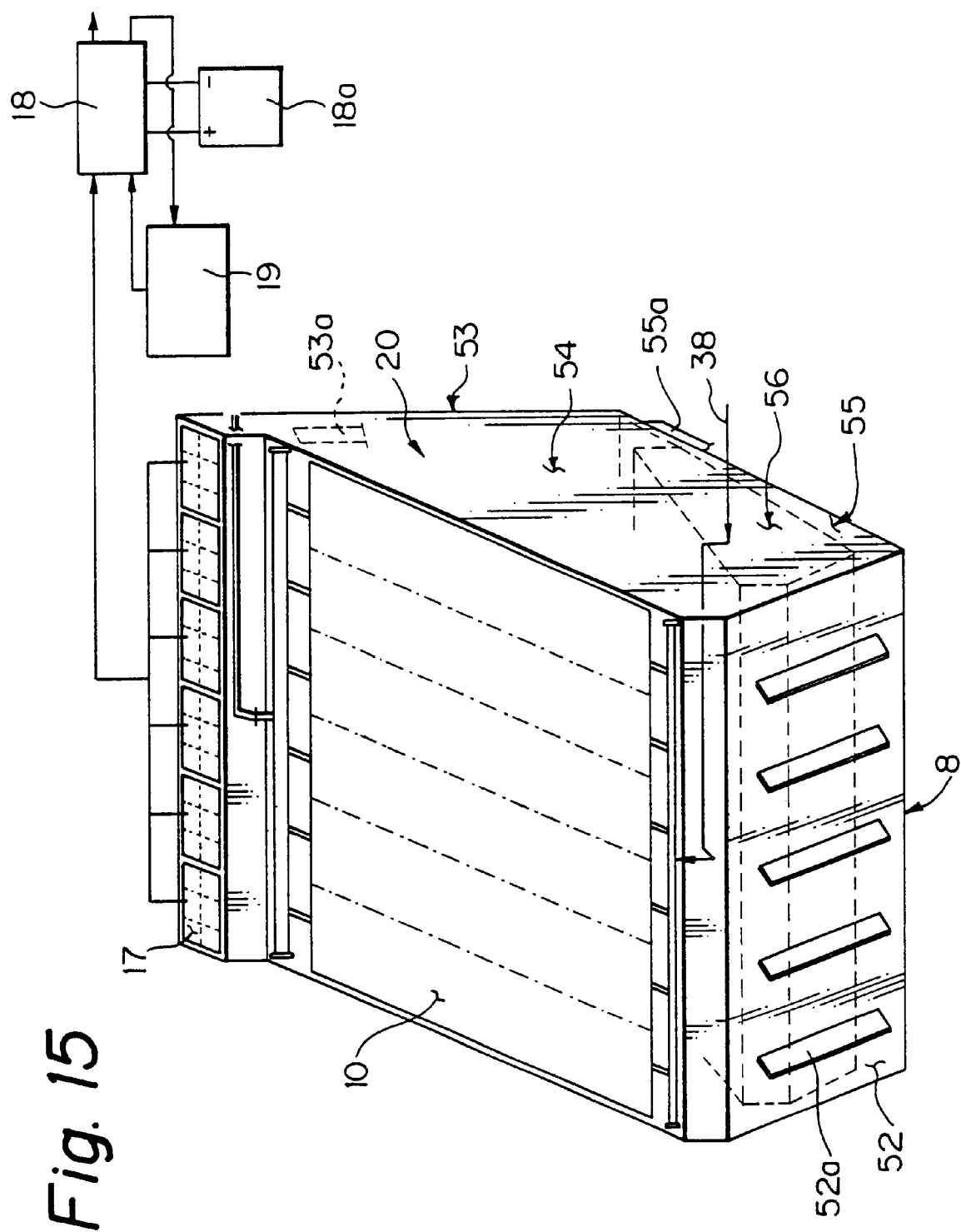
FIG. 15 is a diagram showing the external appearance of the multiple-effect desalination apparatus according to the present invention.

FIG. 14 is a layout drawing of a multiple-effect desalination apparatus according to the present invention. FIG. 15 is a perspective view showing the external appearance of the multiple-effect desalination apparatus. As shown in FIG. 15, the desalination apparatus 8 is surrounded with an air shield 42 including a front plate 52, a rear plate 53, a side plate 54 and a bottom plate 55, and a solar heat collector 10 is placed on the front top surface thereof with a predetermined angle of inclination. Solar batteries 17 are placed on the upper part of the desalination apparatus. A raw water tank 56 is installed in a lower part of the air shield 42, and a vacuum distiller 20 (described later) is disposed above the raw water tank 56. A power generation control panel 18 and a system control panel 19 can be integrated into one unit with a battery 18a incorporated therein. The front plate 52 is provided with radiating fins 52a. The rear plate 53 is provided with radiating fins 32a, and the bottom plate 55 is provided with radiating fins 55a.

The vacuum distiller 20 in FIG. 14 has three evaporation cans 21, 22 and 23 disposed above the raw water tank 56.

The evaporation cans 21, 22 and 23 have heat transfer tubes 21-1, 22-1 and 23-1 in can bodies 21-2, 22-2 and 23-2, respectively. Vapor of a heating medium heated to evaporate with energy collected by the solar heat collector is introduced into the heat transfer tube 21-1 of the evaporation can 21 through a piping 24. The heating medium vapor radiates heat in the heat transfer tube 21-1 to form a heating medium liquid, which is then returned to the solar heat collector through a buffer pipe 25 and pipings 26 and 38. The heating medium is water.

Figure 16:
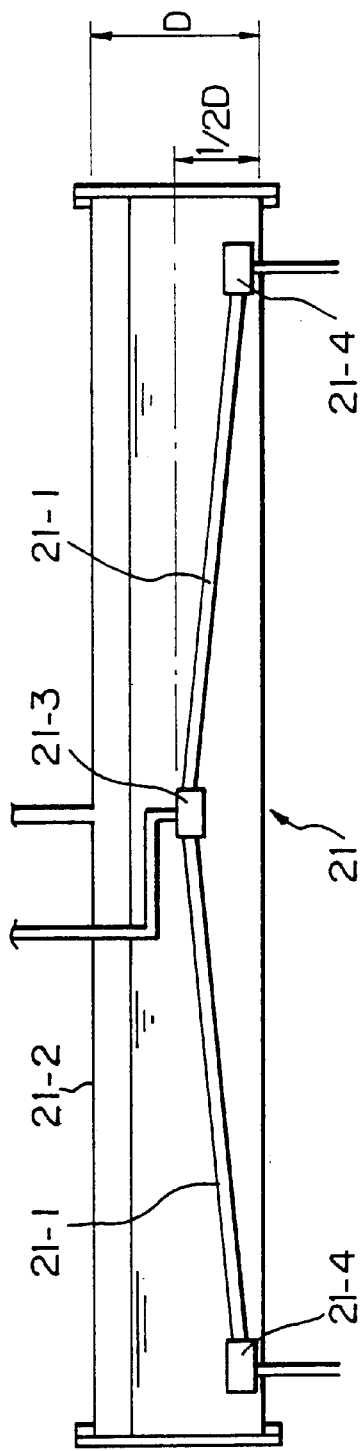
FIG. 16 is a diagram showing another basic structural example of an evaporation can used in the desalination apparatus according to the present invention.
Figure 17:
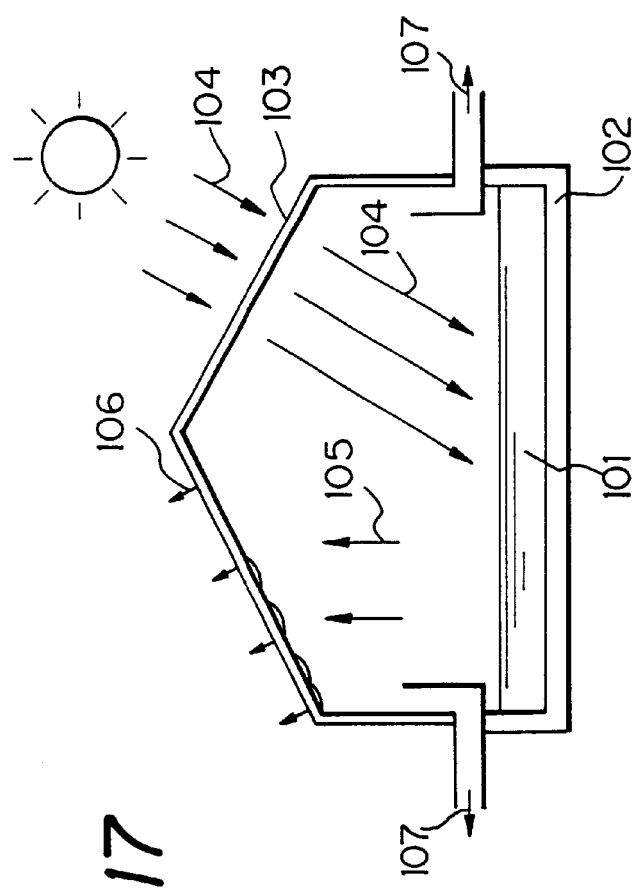
FIG. 17 is a diagram showing a basic structural example of a conventional desalination apparatus utilizing solar energy.

FIG. 16 is a diagram showing a fifth arrangement of an evaporation can used in the desalination apparatus according to the present invention. The evaporation can 21 in FIG. 16 is arranged as follows. The evaporation can 21 has at least one set of heat transfer tubes 21-1 in a can body 21-2 installed horizontally. A chamber 21-3 is provided in the center of the can body 21-2 to install the heat transfer tubes 21-1 collectively. In addition, chambers 21-4 are provided at both sides in the can body 21-2 to install the heat transfer tubes 21-1 collectively. The chamber 21-3 in the center is provided with a heating medium vapor inlet, and the chambers 21-4 at both sides are each provided with a condensed heating medium outlet.

The heat transfer tubes 21-1 are placed at a tilt so that the heating medium inlet side lies above the heating medium outlet side. In addition, the heat transfer tubes 21-1 are positioned below the half of the diameter D of the can body 21-2. By virtue of this arrangement, the pressure loss is small even in a case where the can body 21-2 of the evaporation can 21 is long and hence the heat transfer tubes 21-1 become long. Moreover, the heating medium can be readily discharged without residing undesirably in the heat transfer tubes 21-1.

In the desalination apparatus in FIG. 14, water vapor generated in the can body 21-2 of the evaporation can 21 is introduced through a piping 27 into heat transfer tubes 22-1 of the evaporation can 22, in which the water vapor is condensed by radiation of heat and collected in a distilled water tank 31. Water vapor generated in the can body 22-2 of the evaporation can 22 is introduced through a piping 28 into transfer heat tubes 23-1 of the evaporation can 23, in which the water vapor is condensed by radiation of heat and collected in a distilled water tank 32. Water vapor generated in the can body 23-2 of the evaporation can 23 is introduced through a piping 29 into a condenser (heat transfer tubes) 30 placed in the raw water tank 56, in which the water vapor is condensed by radiation of heat and collected in a distilled water tank 33.

The condenser 30 is arranged as follows. The condenser 30 has at least one set of heat transfer tubes 30-1. A chamber 30-3 is provided in the center of the condenser 30 to install the heat transfer tubes 30-1 collectively. In addition, chambers 30-4 are provided at both sides of the condenser 30 to install the heat transfer tubes 30-1 collectively. The chamber 30-3 in the center is provided with a water vapor inlet, and the chambers 30-4 at both sides are each provided with a condensate outlet. It is desirable for the heat transfer tubes 30-1 to be placed at a tilt such that the water vapor inlet side lies above the condensate outlet side as in the case of the heat transfer tubes of the evaporation cans, which are installed at a tilt. The distilled water in the distilled water tanks 31, 32 and 33 is collected in a distilled water collecting tank 34.

Next, a method of operating the desalination apparatus in FIG. 14 will be described. Raw water containing salt and so forth, which is drawn from the sea, a well or the like, is held in a raw water supply tank 36 after being subjected to a pretreatment. The amount of raw water held in the raw water supply tank 36 is controlled so as to be constant at all times. It is desirable that apparatuses for pre-treating and supplying the raw water have solarlight power generators, respectively or independently, and be operated by using the generated electricity as a power source.

Next, the raw water is supplied from the raw water supply tank 36 to the raw water tank 56 of the desalination apparatus 8 by utilizing the difference in level so that a predetermined water surface level is reached. In the example in FIG. 14, a ball tap (float valve) 37 is used. A supply port for raw water from the supply tank is provided in the vicinity of the condenser 30, which is installed in the bottom of the raw water tank 56. It is convenient to have preparatory processes such as the supply of raw water completed before sunrise, at which the air temperature is the lowest.

The insides of the systems in the sections where evaporation and distillation take place are evacuated to a predetermined degree of vacuum by a vacuum pump 35, namely, the inside of the can body 21-2 (the outside of the heat transfer tubes 21-1) of the evaporation can 21, the insides of the heat transfer tubes 22-1 in the evaporation can 22, the insides of the heat transfer tubes 23-1 in the evaporation can 23, the insides of the heat transfer tubes 30-1 of the condenser 30, the insides of the distilled water tanks 31, 32 and 33, and the insides of the pipings connecting these tanks. It should be noted that the vacuum pump 35 can be replaced with another type of device, e.g. an ejector.

To shut off each system to be evacuated from the outside air, the atmospheric air side of each of three-way valves SV1, SV2 and SV3 is shut off, and the insides of the heat transfer tubes 22-1 in the evaporation can 22, the insides of the heat transfer tubes 23-1 in the evaporation can 23 and the insides of the heat transfer tubes 30-1 of the condenser 30 are communicated with the distilled water tanks 31, 32 and 33, respectively. Valves SVI1, SV12 and SV13, valves SV31, SV32 and SV33, and valves SV41, SV42 and SV43 are closed. Then, valves SV22, SV23 and SV24 are opened, and the vacuum pump 35 is started to evacuate the system until the inside of the system reaches a predetermined degree of vacuum. The predetermined degree of vacuum in this example is 20 Torr.

After the above-described degree of vacuum has been reached, the valves SV31, SV32 and SV33 are opened to supply a predetermined amount of raw water from the raw water tank 16 into each of the can bodies 21-2, 22-2 and 23-2 of the evaporation cans 21, 22 and 23 by utilizing the vacuum. Thereafter, the valves SV31, SV32 and SV33 are closed. In this case, the detection of the amount of raw water supplied is carried out with a liquid level detector installed at a predetermined position in each of the can bodies 21-2, 22-2 and 23-2 of the evaporation cans 21, 22 and 23.

The upper limit level of the liquid surface is determined from the amount of liquid held that is determined from the upper limit of the degree to which raw water may be concentrated and the upper limit of the amount of evaporation. Moreover, the upper limit level is determined so as to be approximately equal to the center of each of the can bodies 21-2, 22-2 and 23-2 (at which the evaporation area is maximized in the case of a horizontal type evaporation can) in order to prevent entrainment of mist. The lower limit level is also determined from the final amount of liquid held at the upper limit of the degree of concentration and, at the same time, it is determined so that the heat transfer tubes 21-1, 22-1 and 23-1 will not dry up (will not be exposed from the liquid surface).

To degas the raw water supplied into the can bodies 21-2, 22-2 and 23-2, the valves SV22, SV23 and SV24 are closed after evacuation has been performed for a predetermined period of time, and at the same time, the vacuum pump 35 is stopped. Thus, the preparation for the evaporation and distillation operation is completed before sunrise. It should be noted that the evacuation and the operation of supplying raw water into the can bodies 21-2, 22-2 and 23-2 and degassing the raw water may be performed simultaneously. Moreover, the series of steps in the process, i.e. from the evacuation to the supply of raw water into the can bodies 21-2, 22-2 and 23-2 and the degassing, may be carried out independently for each of the can bodies 21-2, 22-2 and 23-2.

The valve SV21 is a valve used to degas and evacuate a thermosiphon system when water as a heating medium is sealed in the thermosiphon system, in which a solar heat collector, which collects solar energy to evaporate water as a heating medium in the system, and the insides of the heat transfer tubes 21-1 of the evaporation can 21 for condensing the water vapor are connected by piping. This operation is not necessary as long as air will not leak into the thermosiphon system and the performance will not be degraded.

As the sun rises, solar energy is collected by the solar heat collector and converted into thermal energy. At the same time, water in the solar heat collector, which is a heating medium, is heated to generate water vapor, which serves as a heating source in the evaporation can 21. The water vapor enters the heat transfer tubes 21-1 through the vapor inlet 21-3 provided in the center of the evaporation can 21 to serve as a heating source. The water vapor itself is condensed in the heat transfer tubes 21-1 to become water again. The water flows down from the condensate outlets of the chambers 21-4 provided at both sides and flows into the buffer pipe 25.

The evaporation can 21 and the buffer pipe 25 need to be installed above the vapor outlet, which is at the upper end of the solar heat collector. The water surface in the circulating system is below the heat transfer surface of the evaporation can 21. The heat collecting surface of the solar heat collector 10 is set so as to be below the water surface at all times. In a case where the volumetric capacity of the circulating system is sufficiently large, the buffer pipe 25, which is a cushion tank, is not needed.

The condensate flowing down from the buffer pipe 25 passes through the piping 26 and returns to the solar heat collector 10 through the piping 38, which is provided below the solar heat collector 10. Thus, closed circulation of thermosiphon is constructed. In this embodiment, heat exchange taken place in the raw water in the raw water tank 56 near the water surface as shown in the figure. This is intended to achieve effective utilization of heat.

Meanwhile, in the can body 21-2 (evaporation side) of the evaporation can 21, evaporation starts at the same time as the raw water held in the can body 21-2 is heated, and water vapor is generated. The water vapor is supplied into the heat transfer tubes 22-1 (heating part) of the subsequent evaporation can 22 through the piping 27. In the evaporation can 22, the water vapor enters the heat transfer tubes 22-1 through the chamber 22-3 provided in the center to form a heating source as in the case of the evaporation can 21. The water vapor itself condenses to distilled water and flows down from the condensate outlets of the chambers 22-4 provided at both sides of the heat transfer tubes 22-1. Then, the distilled water flows down through a piping 39 connected to the distilled water tank 31 and is collected in the distilled water tank 31.

On the evaporation side in the evaporation can 22, evaporation starts at the same time as the raw water held in the can body 22-2 is heated, and water vapor is generated, as in the case of the evaporation can 21. The water vapor is supplied into the heat transfer tubes 23-1 (heating part) of the subsequent evaporation can 23 through the piping 28. In the evaporation can 23, the water vapor enters the heat transfer tubes 23-1 through the water vapor inlet of the chamber 23-3 provided in the center and forms a heating source as in the case of the evaporation can 21. The water vapor itself condenses to distilled water and flows down from the condensate outlets of the chambers 23-4 provided at both sides of the heat transfer tubes 23-1. Then, the distilled water flows down through a piping 40 connected to the distilled water tank 32 and is collected in the distilled water tank 32.

In the can body 23-2 of the evaporation can 23, evaporation starts at the same time as the raw water held in the can body 23-2 is heated, and water vapor is generated, as in the case of the evaporation can 22. The water vapor is supplied to the condenser 30, which is installed in the bottom of the raw water tank 56, through the piping 29. In the condenser 30, the water vapor enters the heat transfer tubes 30-1 through the water vapor inlet of the chamber 30-3 provided in the center and forms a heating source for the raw water in the raw water tank 56. The water vapor itself condenses to distilled water and flows down from the condensate outlets of the chambers 30-4 provided at both sides of the heat transfer tubes 30-1. Then, the distilled water flows down through a piping 41 connected to the distilled water tank 33 and is collected in the distilled water tank 33.

As stated above, during the time when solar radiation is available, solar energy is absorbed efficiently and surely with the solar heat collector 10 while following up variations in the quantity of solar radiation, and distillation is continued in the evaporation cans 21, 22 and 23. Furthermore, even during the above-described operation, the following operations (1) to (3) are carried out in order to surely follow up variations in the quantity of solar radiation and to perform distillation efficiently.

(1) The valves SV22, SV23 and SV24 are opened in order that non-condensible gas in the system, which will obstruct evaporation and condensation, shall be discharged out of the system surely and efficiently. Then, the vacuum pump 35 is started to extract gas from the system. It was possible to obtain reliable evaporation and distillation effect by performing gas extraction for 20 seconds every 2 hours. However, it has been found that, in actuality, there is substantially no need for extraction operation, and it is possible to minimize the operating time of the vacuum pump 35 in the gas extraction. The above-described operation (1) may be performed either simultaneously in the systems of the evaporation cans 22 and 23 and condenser 30 or independently for each system. Furthermore, the reason why the gas extraction lines are provided in connection with the distilled water tanks 31, 32 and 33 in the flow according to this embodiment is that non-condensible gas in the system is collected in the condenser part, together with evaporated vapor, and most of water vapor is condensed in the condenser part, thereby efficiently collecting and extracting non-condensible gas.

(2) When there is a large amount of solar radiation and a large amount of distilled water can be obtained, the upper limit level is detected with liquid surface sensors provided in the distilled water tanks 31, 32 and 33. The three-way valves SV1, SV2 and SV3 shut off their sides that are communicated with the evaporation cans 22 and 23 and the condenser 30 to keep the inside of each system at a vacuum. In addition, the atmospheric sides of the three-way valves SV1, SV2 and SV3 are allowed to communicate with the distilled water tanks 31, 32 and 33 to open the insides of the distilled water tanks 31, 32 and 33 to the atmospheric air. After the opening to the atmospheric air, the valves SV11, SV12 and SV13 are opened to allow distilled water in the distilled water tanks 31, 32 and 33 to be introduced into the distilled water collecting tank 34.

After the distilled water in the distilled water tanks 31, 32 and 33 has been discharged, the valves SV11, SV12 and SV13 are closed, and the three-way valves SV1, SV2 and SV3 shut off their atmospheric sides. After the distilled water tanks 31, 32 and 33 have been shut off from the atmospheric air, the valves SV22, SV23 and SV24 are opened, and the vacuum pump 35 is started to evacuate the systems of the distilled water tanks 31, 32 and 33 to a predetermined degree of vacuum. Thereafter, the three-way valves SV1, SV2 and SV3 are actuated to provide communication between the evaporation cans 22 and 23 and the condenser 30 on the one hand and the distilled water tanks 31, 32 and 33 on the other, thereby returning the whole system to a normal operating condition to perform evaporation and distillation. These operations may be performed independently for each system.

(3) When there is a large amount of solar radiation and a large amount of distilled water can be obtained, the raw water in the evaporation cans 21, 22 and 23 is concentrated, and the amount of raw water held decreases. Consequently, the lower limit level is detected with the liquid level sensors installed in the can bodies 21-2, 22-2 and 23-2 of the evaporation cans 21, 22 and 23. When the lower limit level is detected, the valves SV31, SV32 and SV33 are opened to supply a predetermined amount of raw water from the raw water tank 56 into each of the can bodies 21-2, 22-2 and 23-2 of the evaporation cans 21, 22 and 23 by utilizing the vacuum. Thereafter, the valves SV31, SV32 and SV33 are closed. These operations may also be performed independently for each system if necessary.

Furthermore, a convection current is generated in the raw water in the raw water tank 56 by heating from the thermosiphon system in which heat exchange takes place near the water surface, as stated above, and by heat supplied from the condenser 30 installed in the bottom of the raw water tank 56, resulting in a rise in the temperature of water in the surface layer. Consequently, evaporation from the water surface in the raw water tank 56 is promoted. Thus, water vapor is supplied to the air part (evaporation part) in the desalination apparatus 8 covered with the air shield (cover) 42 that shuts off communication with the outside air and, at the same time, serves also as a part for radiating heat into the atmospheric air. Moreover, convective heat transmission is caused in the air part (evaporation part) in the desalination apparatus 8.

At the same time, moisture in the air part (evaporation part) is condensed on the inner surface of the air shield (cover) 42, which also serves as a radiating part, by radiation of heat into the atmospheric air. Condensate thus formed flows down the inner wall of the air shield (cover) 42 and is collected in the distilled water collecting tank 34 through a piping 43 and recovered as distilled water. Thus, the rise in the temperature of the raw water in the raw water tank 56, which serves as a cooling source, is suppressed as much as possible by the evaporation action, and it is made possible to recover distilled water from the raw water in the raw water tank 56 even in the daytime. In this operation, however, the amount of heat radiation is not sufficient because the air-water vapor convective heat transmission is dominant, and the amount of recovered distilled water is smaller than in the evaporation cans 21, 22 and 23.

When the sun sets, the solar radiation stops. At the same time, the air temperature begins to fall rapidly. Therefore, cooling by sky radiation is enhanced. Consequently, the amount of heat radiated from the air shield (cover) 42, which also serves as a radiating part of the desalination apparatus 8, also increases rapidly. The raw water in the desalination apparatus 8 heated by the sunshine emits the potential heat by evaporation to cool down. At the same time, evaporated water vapor is recovered usefully as distilled water as in the case of the above.

In particular, the raw water in the raw water tank 56, which was heated in the daytime and has not sufficiently undergone the heat radiation by evaporation, has a large amount of potential heat because the amount of raw water held in the raw water tank 56 is also large. Accordingly, a large amount of distilled water can be recovered by evaporation and heat radiation at night. Moreover, because it is sufficiently cooled, the raw water can be effectively utilized as a cooling source for the condenser 30 on the following day.

When the recovery of distilled water has been completed upon completion of the cooling at night, the insides of the evaporation cans 21, 22 and 23 are opened to the atmospheric air, and distilled water in the distilled water tanks 31, 32 and 33 is recovered. In addition, the concentrated raw water in the evaporation cans 21, 22 and 23 is discharged out of the system.

More specifically, the three-way valves SV1, SV2 and SV3 are switched to the respective atmospheric open positions to allow the distilled water tanks 31, 32 and 33 to communicate with the atmospheric air, thereby opening the insides of the distilled water tanks 31, 32 and 33 to the atmospheric air. After the opening to the atmospheric air, the valves SV11, SV12 and SV13 are opened to allow the distilled water in the distilled water tanks 31, 32 and 33 to flow down into the distilled water collecting tank 34.

It is unnecessary to operate the valves SV31, SV32 and SV33. However, for the purpose of discharging the concentrated raw water remaining in the piping, it is preferable to open these valves after the concentrated raw water held in the can bodies 21-2, 22-2 and 23-2 has been discharged out of the system. Thus, a day's operation of the apparatus is completed, and the process returns to the first operation. The three-way valves SV1, SV2 and SV3 may be each constructed by using 2 two-way valves as one set, as a matter of course.

In addition, the valve SV51 is a valve for discharging the concentrated raw water from the raw water tank 56 as occasion demands. Normally, a bypass valve V-1 for the valve SV51 is opened by inching to discharge the concentrated raw water and supply a small amount of raw water for replacement at all times. Therefore, the valve SV51 is hardly actuated. Furthermore, because the amount of raw water held in the raw water tank 56 is also large, there may be a case where the raw water is not discharged constantly through the bypass valve V-1. In this embodiment, an oil-sealed rotary vacuum pump is used as the vacuum pump 35. Therefore, an oil separator 44 is provided to prevent deterioration of oil. A valve SV52 is a valve for discharging drain separated by the oil separator 44.

All the electric power required for operating the desalination apparatus, including the vacuum pump 35 as a vacuum producing source, the control valves, the controller, etc., is supplied from a solarlight power generation system having a battery. In the example in FIG. 15, the power generation control panel 18 and the system control panel 19 are integrated with the desalination apparatus, and thus the whole plant is made compact in size. By minimizing the operating time of the vacuum pump 35 and also minimizing the operating power for each valve, the capacities of the solar batteries 17 and battery 18a are minimized. The desalination apparatus can be provided with an automatic operating device, although it is not detailed herein, (Effect of the Invention)

The desalination apparatus according to the present invention uses solar energy as a heat source and does not use a fossil fuel. Therefore, the desalination apparatus is economical and does not cause environmental pollution. The present invention uses a heating medium and therefore has no possibility of raw water components adhering to the solar heat collector. Accordingly, the present invention has a long useful line. In the present invention, the evaporation cans and the condenser are depressurized and arranged in a multiple-effect structure, thereby enabling a large mount of distilled water to be obtained by using solar energy as a heat source. The power required for operating the desalination apparatus is supplied from solar batteries. Accordingly, the desalination apparatus can be installed and operated in a desert region, a solitary island, etc.

What is claimed is:

1. A desalination apparatus utilizing solar energy comprising:
    a heat collector for heating a heating medium with solar energy,
    an evaporation can, comprising:
        a heat exchanger associated with the heat collector, said heat exchanger comprising:
            a heat transfer tube containing the heating medium, said heat transfer tube extending into and submerged in raw water in the evaporation can, for providing heat exchange between the heating medium and the raw water resulting in the generation of water vapor,
        a raw water tank, comprising:
            a condenser; and
            another heat transfer tube associating the condenser with the evaporation can, which receives water vapor from the evaporation can, said another heat transfer tube being submerged in raw water in the raw water tank to cool the water vapor by subjecting the water vapor and raw water in the raw water tank to heat exchange thereby obtaining distilled water,
        a distilled water tank for storing the distilled water,
        a vacuum means for evacuating the evaporation can and depressurizing an inside of the evaporation can so as to promote generation of water vapor in the evaporation can, and
    raw water supply means for supplying raw water to the evaporation can,
    wherein said heating medium is circulated by an action of thermosiphon in which said heating medium is heated in the solar heat collector to form vapor, which is then cooled to become liquid in the evaporation can.

2. The desalination apparatus of claim 1, further comprising additional evaporation cans;
    wherein said heat exchanger is arranged to cooperate with a first of the evaporation cans, and the condenser associated with the raw water tank is arranged to receive water vapor from a final of the evaporation cans; and further comprising a plurality of condensers disposed to cooperate with the evaporation cans so as to receive water vapor from an upstream-side evaporation can, cool the water vapor with raw water in a downstream-side evaporation can and thereby produce distilled water, heat the raw water in the downstream-side evaporation can and generate water vapor.

3. The desalination apparatus of claim 2, wherein said heat transfer tube of the condenser extends approximately horizontally in the evaporation can, and further comprising a heating part and evaporation part for the raw water formed between an inner surface of the evaporation can and an outer surface of the heat transfer tube.

4. The desalination apparatus of claim 3, wherein said heat transfer tube of said condenser cooperating with evaporation cans is tilted slightly with respect to a horizontal direction so that a vapor inlet side is above a vapor outlet side.

5. The desalination apparatus of claim 1, wherein said heating medium is water.

6. The desalination apparatus of claim 1, further having an air shield that covers the raw water tank, the air shield having a structure in which an inner surface of the air shield cools water vapor to form distilled water and collects the distilled water, an outer surface of the air shield being adapted to be a radiating part.

7. The desalination apparatus of claim 6, wherein an energy collecting part of the solar heat collector is placed in a part of an upper outer surface of the air shield on which sunlight impinges.

8. The desalination apparatus of claim 6, wherein at least a heating part of the evaporation can is placed in the air shield.

9. The desalination apparatus of claim 1, wherein the solar heat collector is placed to cover an upper part of a whole of the desalination apparatus so as to intercept sunlight directed toward the other part of the desalination apparatus.

10. The desalination apparatus of claim 1, wherein said heat transfer tube of the heat exchanger extends approximately horizontally in the evaporation can, and further comprising a heating part and evaporation part for the raw water formed between an inner surface of the evaporation can and an outer surface of the heat transfer tube.

11. The desalination apparatus of claim 10, wherein said heat transfer tube of said heat exchanger is tilted with respect to a horizontal direction so that a vapor inlet side is above a vapor outlet side.

12. The desalination apparatus of claim 1, wherein said heat transfer tube of the condenser extends approximately parallel and adjacent to a bottom surface of said raw water tank.

13. The desalination apparatus of claim 1, wherein said raw water tank is capable of containing raw water to a depth at which a thermal stratification is formed.

14. The desalination apparatus of claim 1, wherein said raw water tank has an air diffuser tube that supplies air bubbles into the raw water.

15. The desalination apparatus of claim 14, wherein said air diffuser tube is placed so as to supply air bubbles into the raw water near a surface of the raw water.

16. The desalination apparatus of claim 1, further having solarlight power generation equipment, so that the desalination apparatus is driven by electric power supplied from the solarlight power generation equipment.

17. A method of operating a desalination apparatus having a solar heat collector for heating a heating medium with solar energy, a plurality of evaporation cans, a distilled water tank, a raw water tank, a vacuum means for evacuating the evaporation cans and depressurizing insides of the evaporation cans, and raw water supply means for supplying raw water to the evaporation cans, said method comprising the steps of:

supplying an amount of raw water into the evaporation cans by operating the raw water supply means;

evacuating the evaporation cans to produce a degree of vacuum in the evaporation cans by operating the vacuum means;

circulating the heating medium by an action of thermosiphon in which said heating medium is heated in the solar heat collector to form vapor, which is then cooled to become liquid in a first evaporation can to convey solar energy to the raw water in the first evaporation can from the solar heat collector through the heating medium in a heat transfer tube submerged in the raw water in the first evaporation can to evaporate the raw water;

successively cooling water vapor generated in an upstream-side evaporation can with the raw water in a downstream-side evaporation can to condense the water vapor in a heat transfer tube submerged in the raw water in the downstream-side evaporation can to distilled water and collecting the distilled water in the distilled water tank and further generating water vapor in the downstream-side evaporation can;

cooling water vapor generated in a final evaporation can with raw water in the raw water tank to condense the water vapor to distilled water in a heat transfer tube submerged in the raw water in the raw water tank and collecting the distilled water in the distilled water tank;

taking out the distilled water collected in the distilled water tank; and discharging concentrated raw water from the evaporation cans.

18. The operating method of claim 17, wherein said step of supplying an amount of raw water into the evaporation cans and the step of evacuating the evaporation cans to produce a degree of vacuum in the evaporation cans by operating the vacuum means are started simultaneously.

19. The operating method of claim 17, wherein the step of taking out the distilled water collected in the distilled water tank, the step of discharging concentrated raw water from the evaporation cans, the step of supplying an amount of raw water into the evaporation cans by operating the raw water supply means, and the step of evacuating the evaporation cans to produce a degree of vacuum in the evaporation cans by operating the vacuum means are carried out and completed in a period of time before sunrise.

* * * * *